United States Patent
Hu

(10) Patent No.: US 10,432,334 B2
(45) Date of Patent: Oct. 1, 2019

(54) METHOD AND SYSTEM FOR SWITCHING LIVING BROADCAST BETWEEN LANDSCAPE BROADCASTING MODE AND PORTRAIT BROADCASTING MODE FOR LIVE BROADCAST WEBSITE

(71) Applicant: WUHAN DOUYU NETWORK TECHNOLOGY CO., LTD., Wuhan (CN)

(72) Inventor: Longjun Hu, Wuhan (CN)

(73) Assignee: WUHAN DOUYU NETWORK TECHNOLOGY CO., LTD., Wuhan (Hubei) (CN)

( * ) Notice: Subject to any disclaimer, the term of this patent is extended or adjusted under 35 U.S.C. 154(b) by 0 days.

(21) Appl. No.: 15/777,110

(22) PCT Filed: Apr. 17, 2017

(86) PCT No.: PCT/CN2017/080783
§ 371 (c)(1),
(2) Date: May 17, 2018

(87) PCT Pub. No.: WO2017/219741
PCT Pub. Date: Dec. 28, 2017

(65) Prior Publication Data
US 2019/0109658 A1 Apr. 11, 2019

(30) Foreign Application Priority Data
Jun. 24, 2016 (CN) .......................... 2016 1 0472919

(51) Int. Cl.
*H04H 20/86* (2008.01)
*H04H 60/19* (2008.01)
(Continued)

(52) U.S. Cl.
CPC ............ *H04H 20/86* (2013.01); *H04H 60/19* (2013.01); *H04H 60/40* (2013.01); *H04N 21/2187* (2013.01); *H04N 21/431* (2013.01)

(58) Field of Classification Search
CPC . G06Q 10/10; H04L 12/1831; H04L 65/4084; H04L 65/4092; H04H 20/86;
(Continued)

(56) References Cited

U.S. PATENT DOCUMENTS

| | | | |
|---|---|---|---|
| 7,330,875 B1 * | 2/2008 | Parasnis | G06Q 10/10 709/203 |
| 9,723,242 B1 * | 8/2017 | Fulay | H04N 7/15 |

(Continued)

FOREIGN PATENT DOCUMENTS

| | | |
|---|---|---|
| CN | 102104672 A | 6/2011 |
| CN | 103533386 A | 1/2014 |

(Continued)

OTHER PUBLICATIONS

Search Report for PCT/CN2017/080783, dated May 31, 2017.
(Continued)

*Primary Examiner* — Tan H Trinh
(74) *Attorney, Agent, or Firm* — Dinsmore & Shohl LLP

(57) ABSTRACT

Disclosed is a method for switching living broadcast between landscape broadcasting mode and portrait broadcasting mode, applicable to live broadcasting website. The method comprises: S1, an administrator setting categories and category settings for live broadcasting videos; S2, the administrator adding landscape option and portrait option for the live broadcasting video into each category; S3, a presenter selecting on a client terminal a live broadcasting mode, and selecting the category as well as landscape or portrait option for live broadcasting video; S4, the presenter selecting to start live broadcasting, the administration back
(Continued)

end verifying whether the landscape or portrait option selected by the presenter is consistent with the selected live broadcasting mode; if yes, performing step S6; otherwise performing step S5; S5, the administration back end modifying the landscape or portrait option selected by the presenter; S6, the administration back end allowing the live broadcast to start, and ending.

10 Claims, 3 Drawing Sheets

(51) Int. Cl.
    *H04H 60/40*         (2008.01)
    *H04N 21/2187*    (2011.01)
    *H04N 21/431*     (2011.01)

(58) Field of Classification Search
    CPC .... H04H 60/19; H04H 60/40; H04N 21/2187; H04N 21/431
    USPC ...... 455/416, 154.2; 709/203, 205; 715/300, 715/732, 733, 730, 753; 714/6.24
    See application file for complete search history.

(56) References Cited

U.S. PATENT DOCUMENTS

| | | | | |
|---|---|---|---|---|
| 2002/0186236 A1* | 12/2002 | Brown | ................ | G06F 3/14 715/730 |
| 2004/0008221 A1* | 1/2004 | O'Neal | ................ | G01N 30/56 715/730 |
| 2005/0034079 A1* | 2/2005 | Gunasekar | ............ | G06F 17/289 715/753 |
| 2008/0209330 A1* | 8/2008 | Cruver | ................ | H04L 12/1831 715/733 |
| 2009/0037821 A1* | 2/2009 | O'Neal | ................ | G06F 3/0481 715/732 |
| 2010/0100899 A1* | 4/2010 | Bradbury | ............ | H04N 7/17318 725/29 |
| 2012/0117153 A1* | 5/2012 | Gunasekar | ............ | G06F 17/289 709/204 |
| 2012/0192229 A1 | 7/2012 | Hunter | | |
| 2013/0205167 A1* | 8/2013 | Deepak | ................ | G06F 11/2094 714/6.24 |
| 2014/0215386 A1* | 7/2014 | Song | ................ | G06F 3/04855 715/787 |
| 2014/0229866 A1* | 8/2014 | Gottlieb | ................ | H04L 65/403 715/758 |
| 2015/0100503 A1* | 4/2015 | Lobo | ................ | G06Q 10/103 705/301 |
| 2015/0106435 A1* | 4/2015 | Wang | ................ | H04L 67/42 709/203 |
| 2015/0127340 A1* | 5/2015 | Epshteyn | ................ | G10L 15/26 704/235 |
| 2015/0154291 A1* | 6/2015 | Shepherd | ................ | H04L 65/403 707/748 |
| 2015/0261271 A1* | 9/2015 | Nagamori | ................ | G06F 1/26 713/300 |
| 2015/0304593 A1* | 10/2015 | Sakai | ................ | G09G 5/14 348/565 |
| 2015/0334142 A1* | 11/2015 | Gottlieb | ................ | H04N 7/15 715/753 |
| 2016/0057184 A1* | 2/2016 | O'Brien | ................ | H04W 4/80 709/205 |
| 2017/0208362 A1* | 7/2017 | Flores | ................ | H04N 21/44218 |
| 2017/0244985 A1* | 8/2017 | Masterson | .......... | H04N 21/2187 |
| 2017/0249919 A1* | 8/2017 | Bae | ........................ | G09G 5/005 |
| 2018/0032997 A1* | 2/2018 | Gordon | .............. | G06Q 20/3224 |
| 2018/0323988 A1* | 11/2018 | Beel | ........................ | H04N 7/15 |
| 2018/0348883 A1* | 12/2018 | Kramer | ................ | G06F 3/017 |

FOREIGN PATENT DOCUMENTS

| | | |
|---|---|---|
| CN | 103763113 A | 4/2014 |
| CN | 104581221 A | 4/2015 |
| CN | 105681885 A | 6/2016 |
| CN | 105979342 A | 9/2016 |

OTHER PUBLICATIONS

"Douyou Live Broadcast Companion-Course of Playing on Vertical Screen with Phone", https://www.douyu.com/cms/zhibo/201604/25/3424.shtml, Apr. 25, 2016 (Apr. 25, 2016), the whole document.

* cited by examiner

METHOD AND SYSTEM FOR SWITCHING LIVING BROADCAST BETWEEN LANDSCAPE BROADCASTING MODE AND PORTRAIT BROADCASTING MODE FOR LIVE BROADCAST WEBSITE

TECHNICAL FIELD

The present disclosure relates to the technical field of video live broadcast, and particularly to a method and a system for switching a living broadcast between landscape broadcasting mode and a portrait broadcasting mode, applicable for a live broadcast website.

BACKGROUND ART

Videos generally broadcasted on a live broadcast website in two live modes, i.e., landscape screen mode and portrait screen mode. A presenter can select, at a client terminal, the landscape screen mode or the portrait screen mode to conduct the live broadcast, and can also switch between the two mode s. However, if the presenter selects the categories of landscape screen or portrait screen improperly, there will occur the case where the portrait screen live broadcast occurs in a studio of the landscape screen category, or landscape screen live broadcast occurs in a studio of portrait screen category. Moreover, if the presenter switches between the landscape screen category and the portrait screen category frequently, excessive burden will be caused to the server, and accordingly proper restrictions should be provided. Therefore, there is an urgent need for a technical solution of switching between landscape broadcasting mode and portrait broadcasting mode that is capable of solving the above problem.

SUMMARY OF THE DISCLOSURE

In view of the defects in the prior art, the present disclosure aims to provide a method and a system for switching a living broadcast between a landscape broadcasting mode and a portrait broadcasting mode, applicable to a live broadcast website, which enables a presenter to switch between landscape broadcasting mode and portrait broadcasting mode, and prevents the occurrence of the case where portrait broadcasting occurs in a studio of the landscape broadcasting mode, or landscape broadcasting mode occurs in a studio of the portrait broadcasting mode.

In order to achieve the above object, the technical solution employed by the embodiments of the present disclosure is: a method for switching a living broadcast between a landscape broadcasting mode and a portrait broadcasting mode, applicable to a live broadcast website. The method includes steps of:

S1, an administrator setting, at an administration back end, categories and category settings for live broadcasting videos;

S2, the administrator adding, at the administration back end, a landscape option and a portrait option for the live broadcasting videos into each of the categories;

S3, a presenter selecting, on a client terminal, a landscape broadcasting mode or a portrait broadcasting mode as a live broadcasting mode, and selecting the category as well as the landscape or portrait option for a live broadcasting video;

S4, the presenter selecting to start the live broadcast, and the administration back end verifying whether the landscape or portrait option selected by the presenter is consistent with the selected live broadcasting mode, wherein if the landscape or portrait option selected by the presenter is consistent with the selected live broadcasting mode, step S6 is performed, otherwise, step S5 is performed;

S5, the administration back end modifying the landscape or portrait option selected by the presenter; and S6, allowing, by the administration back end, the live broadcast to start, and ending.

On the basis of the above technical solution, step S3 further includes: the presenter selecting the landscape or portrait option for a live broadcasting video, and the administration back end verifying whether the selection performed by the presenter meets a time limit condition, wherein if the selection performed by the presenter meets the time limit condition, step S4 is performed; otherwise, the administration back end returns to the client terminal a message indicating that the selecting fails, and performance of the method ends.

On the basis of the above technical solution, step S6 further includes: after the live broadcast is finished, the presenter selecting to turn off the live broadcast, and the administration back end clearing the landscape or portrait option selected by the presenter so as to allow the live broadcast to be turned off.

On the basis of the above technical solution, step S6 further includes:

S601, the administration back end allowing the live broadcast to start, and the administration back end determining whether the live broadcast is in the portrait broadcasting mode, wherein if the live broadcast is in the portrait screen broadcasting mode, step S603 is directly performed; otherwise, step S602 is performed;

S602, the administration back end recording a log for the presenter's category operation;

S603, the presenter selecting to turn off the live broadcast, after the live broadcast is finished;

S604, the administration back end determining whether the live broadcast is in the portrait broadcasting mode, wherein if the live broadcast is in the portrait broadcasting mode, step S605 is performed; otherwise, step S606 is directly performed;

S605, the administration back end clearing the landscape or portrait option selected by the presenter, and automatically returning to the landscape or portrait option in the log for the presenter's category operation with the log recorded in step S602 for a last time;

S606, allowing, by the administration back end, the live broadcast to be turned off, and endings.

On the basis of the above technical solution, the category settings include category name, category cover, category serial number and presenter's authority.

On the basis of the above technical solution, the time limit condition is that a time period during which the presenter selects the category is greater than a preset value set by the administrator.

On the basis of the above technical solution, the specific process of step S2 includes: the administrator adding an additional category record to a relational database management system, i.e. MySQL database, of the administration back end, and then adding a cached data of the category record to a Redis database of the administration back end, so that the adding of the landscape option and the portrait option is completed.

The present disclosure further provides a system for switching a living broadcast between a landscape broadcasting mode and a portrait broadcasting mode, applicable to a live broadcast website. The system includes a client terminal and an administration back end. Specifically, the client terminal is configured to receive a category of a live broadcasting video, a landscape or portrait option and a live broadcasting mode which are selected by a presenter, and send the selected category, the selected landscape or portrait option and the selected live broadcasting mode to the administration back end. The administration back end includes: a category setting module configured to set categories and category settings for live broadcasting videos, and add a landscape option and a portrait option for the live broadcasting videos; a category verifying module configured to receive, from the client terminal, the category of the live broadcasting video, the landscape or portrait option and the live broadcasting mode which are selected by the presenter, and verify whether the landscape or portrait option selected by the presenter is consistent with the live broadcasting mode; a category modification module configured to modify the landscape or portrait option selected by the presenter, and clear the landscape or portrait option selected by the presenter after the live video broadcast is finished; a data storage module configured to store an category record added by an administrator and a cached data of the category record; a live broadcast status control module configured to control starting of the live broadcast and turning-off of the live broadcast.

On the basis of the above technical solution, the category verifying module is further configured to verify whether the selection performed by the presenter meets a time limit condition.

On the basis of the above technical solution, the administration back end further includes a live broadcasting mode determining module configured to determine whether the live broadcasting video is in a landscape broadcasting mode or a portrait broadcasting mode.

Compared with the prior art, the present disclosure has the following advantages, in which:

1. the presenter can select landscape broadcasting mode or portrait broadcasting mode, and can switch therebetween;

2. the time condition provided for the presenter to select the category is limited, which prevents the presenter from switching between different modes frequently, thus excessive pressure to the server is avoided;

3. it is verified that whether the category selected by the presenter is consistent with the live broadcasting mode, which prevents the occurrence of the case where portrait broadcasting mode occurs in a studio of the landscape broadcasting mode, or landscape broadcasting mode occurs in a studio of the portrait broadcasting mode; and 4. the presenter's each selection for landscape broadcasting mode is recorded, and after the completion of portrait broadcasting mode by the presenter, the administration back end clears up the portrait option selected by the presenter, and automatically returns to the setting of the landscape category in the record of the latest landscape broadcasting mode, so that if landscape broadcasting mode is to be carried out next time, the presenter unnecessarily perform again selecting operation on the landscape option, which simplifies the operations by the presenter.

REFERENCE SIGNS

1—client terminal, 2—administration back end, 21—category setting module, 22—category verifying module, 23—category modification module, 24—data storage module, 25—live broadcast status control module, 26—live broadcasting mode determining module.

DETAILED DESCRIPTION OF THE DISCLOSURE

Below, the present disclosure is further described in detail in connection with embodiments with reference to the accompanying drawings.

Figure 1:
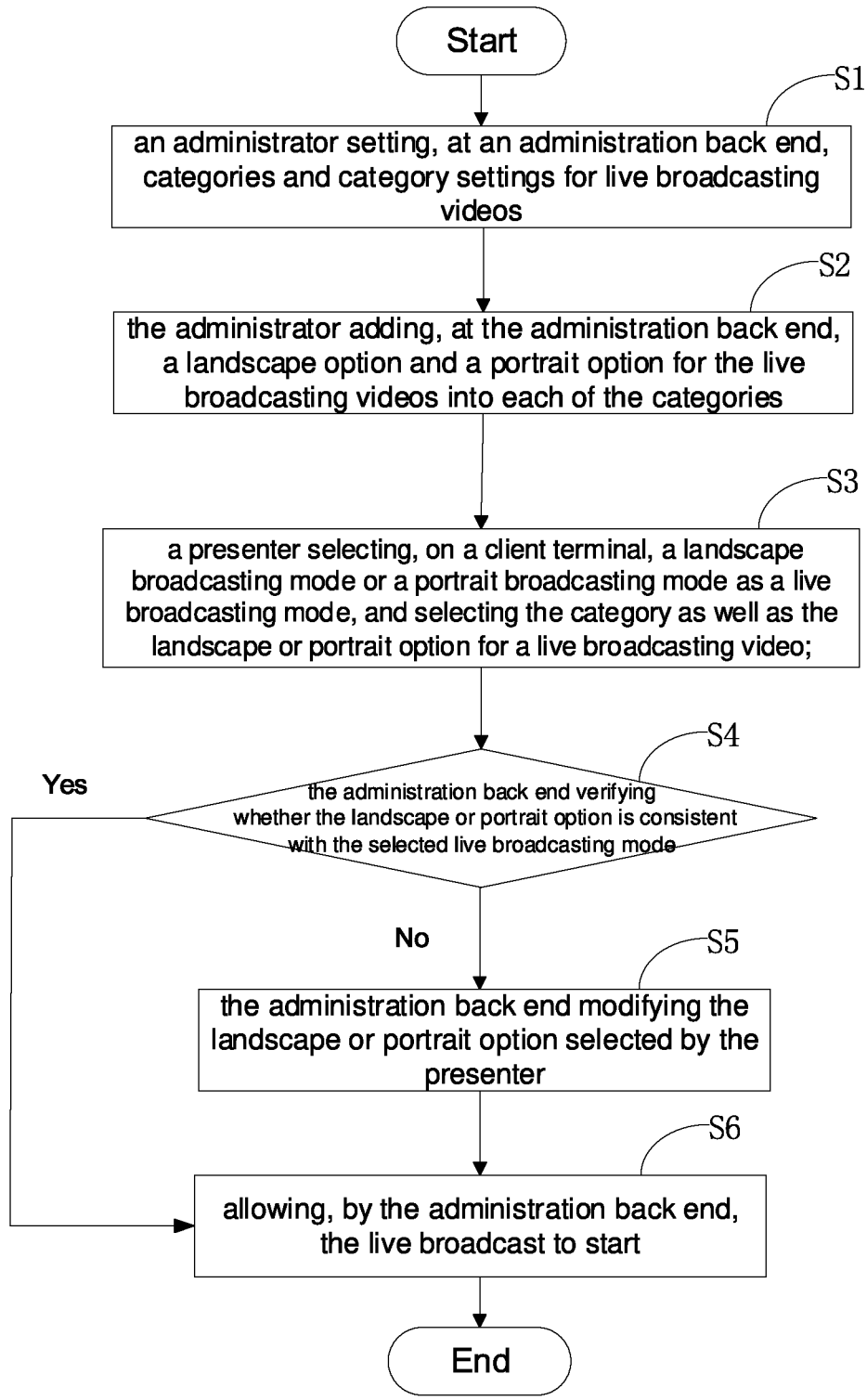
FIG. 1 is an schematic flow diagram of a method for switching a living broadcast between a landscape broadcasting mode and a portrait broadcasting mode, applicable to a live broadcast website.

As shown in FIG. 1, an embodiment of the present disclosure provides a method for switching a living broadcast between a landscape broadcasting mode and a portrait broadcasting mode, applicable to a live broadcast website. The method includes the steps of:

S1, an administrator setting, at the administration back end 2, categories and category settings for live video broadcast; specifically, the category settings include category name, category cover, category serial number and presenter's authority.

S2, the administrator adding, at the administration back end 2, a landscape option and portrait option for the live broadcasting videos into each of the categories; specifically, the specific process of step S2 includes: the administrator adding an additional category record to a relational database management system, i.e. MySQL database, of the administration back end 2, and then adding a cached data of the category record to a Redis database of the administration back end 2, so that the adding of the landscape option and the portrait option is completed.

S3, a presenter selecting, on a client terminal (1), a landscape broadcasting mode or a portrait broadcasting mode as a live broadcasting mode, and selecting the category as well as the landscape or portrait option for a live broadcasting video; specifically, step S3 further includes: the presenter selecting the landscape or portrait option for a live broadcasting video, and the administration back end 2 verifying whether the selection performed by the presenter meets a time limit condition, wherein if the selection performed by the presenter meets the time limit condition, step S4 is performed; otherwise, the administration back end 2 returns to the client terminal 1 a message indicating that the selecting fails, and performance of the method ends. The time limit condition is that a time period during which the presenter selects the category is greater than a preset value set by the administrator. The time condition provided for the presenter to select the landscape or portrait mode is limited, which prevents the presenter from switching between different modes frequently, thus excessive pressure to the server is avoided.

S4, the presenter selecting to start the live broadcast, and the administration back end (2) verifying whether the landscape or portrait option selected by the presenter is consistent with the selected live broadcasting mode, wherein if the landscape or portrait option selected by the presenter is consistent with the selected live broadcasting mode, step S6 is performed, otherwise, step S5 is performed;

S5, the administration back end 2 modifying the landscape or portrait option selected by the presenter, i.e. modifying the selected option for live broadcast into the portrait category, and modifying the selected option for portrait broadcasting mode into the landscape category. It is verified that whether the option selected by the presenter is consistent with the selected live broadcasting mode, which prevents the occurrence of the case where portrait broadcasting mode occurs in a studio of the landscape broadcasting mode, or landscape broadcasting mode occurs in a studio of the portrait broadcasting mode.

S6, allowing, by the administration back end 2, the live broadcasting to start, and ending. The administrator modifies the category record in the relational database management system, i.e. MySQL database, of the administration back end 2, and then adding a cached data of the modified category record to a Redis database of the administration back end 2, so that the modification of category to the landscape or portrait category is completed.

Step S6 further includes: after the live broadcast is finished, the presenter selecting to turn off the live broadcast, and the administration back end 2 clearing the landscape or portrait option selected by the presenter so as to allow the live broadcast to be turned off.

Figure 2:
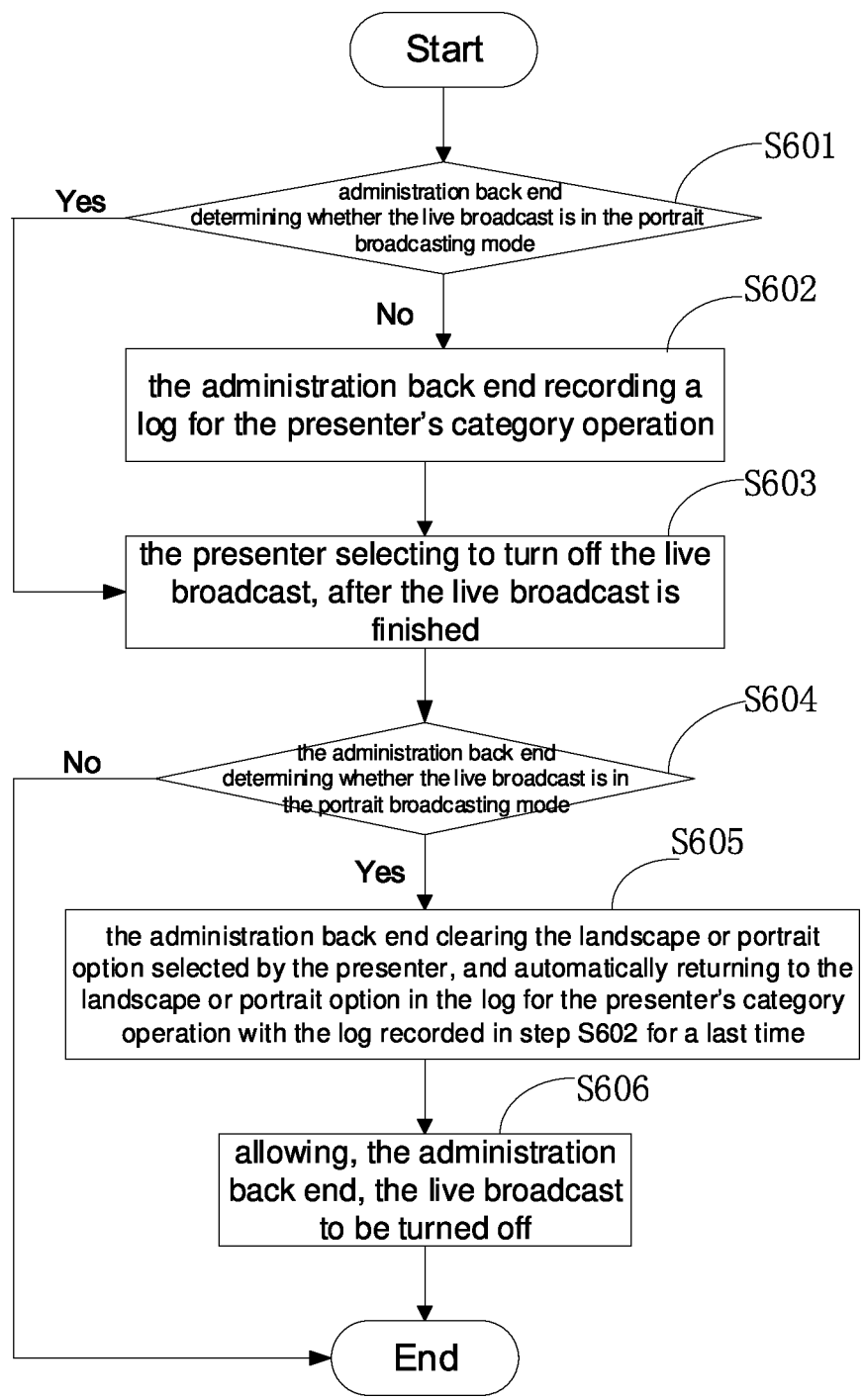
FIG. 2 is an schematic flow diagram of step S6 of the method for switching a living broadcast between a landscape broadcasting mode and a portrait broadcasting mode, applicable to a live broadcast website.

As shown in FIG. 2, in order to simplify the presenter's selection for the landscape or portrait option, step S6 further includes:

S601, the administration back end 2 allowing the live broadcast to start, and the administration back end 2 determining whether the live broadcast is in the portrait broadcasting mode, wherein if the live broadcast is in the portrait screen broadcasting mode, step S603 is directly performed; otherwise, step S602 is performed;

S602, the administration back end 2 recording a log for the presenter's category operation;

S603, the presenter selecting to turn off the live broadcast, after the live broadcast is finished;

S604, the administration back end 2 determining whether the live broadcast is in the portrait broadcasting mode, wherein if the live broadcast is in the portrait broadcasting mode, step S605 is performed; otherwise, step S606 is performed;

S605, the administration back end 2 clearing the landscape or portrait option selected by the presenter, and automatically returning to the landscape or portrait option in the log for the presenter's category operation with the log recorded in step S602 for a last time; and S606, allowing, by the administration back end 2, the live broadcast to be turned off, and endings.

The presenter's each selection for landscape broadcasting mode is recorded, and the administration back end clearing the landscape or portrait option selected by the presenter, and automatically returning to the landscape option in the landscape category setting in the log for the landscape broadcasting mode for a last time, so that if landscape broadcasting mode is to be carried out next time, the presenter unnecessarily perform again selecting operation on the landscape category, which simplifies the operations by the presenter.

Figure 3:
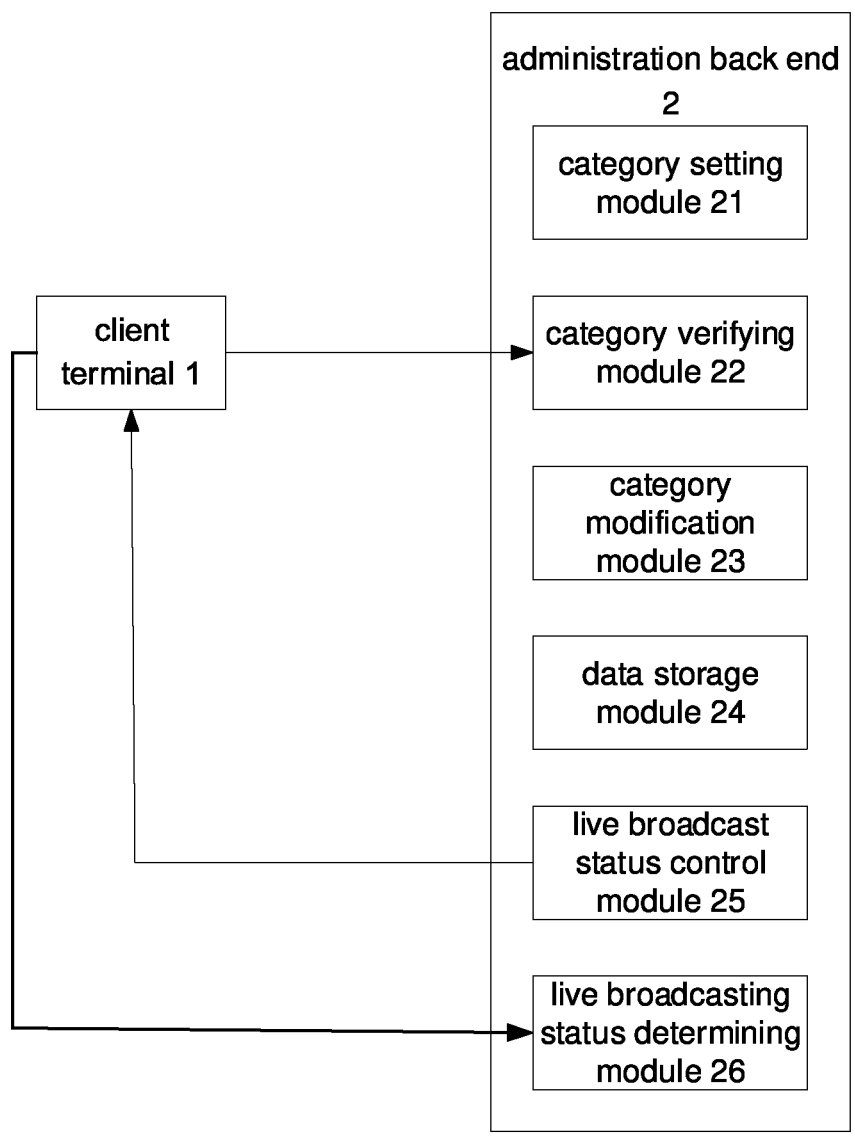
FIG. 3 is a schematic structural diagram of a system for switching a living broadcast between a landscape broadcasting mode and a portrait broadcasting mode, applicable to a live broadcast website.

As shown in FIG. 3, an embodiment of the present disclosure further discloses a system for switching a living broadcast between a landscape broadcasting mode and a portrait broadcasting mode, applicable to a live broadcast website. The system includes:

a client terminal 1 and an administration back end 2.

specifically, the client terminal 1 is configured to receive a category of a live broadcasting video, a landscape or portrait option and a live broadcasting mode which are selected by a presenter, and send the selected category, the selected landscape or portrait option and the selected live broadcasting mode to the administration back end 2;

the administration back end 2 includes: a category setting module 21 configured to set categories and category settings for live broadcasting videos, and add a landscape option and a portrait option for the live broadcasting videos; a category verifying module 22 configured to receive, from the client terminal 1, the category of the live broadcasting video, the landscape or portrait option and the live broadcasting mode which are selected by the presenter, and verify whether the landscape or portrait option selected by the presenter is consistent with the live broadcasting mode; a category modification module 23 configured to modify the landscape or portrait option selected by the presenter, and clear the landscape or portrait option selected by the presenter after the live broadcast is finished; a data storage module 24 configured to store an category record added by an administrator and a cached data of the category record; and a live broadcast status control module 25 configured to control starting of the live broadcast and turning-off of the live broadcast.

The category checking module 22 is further configured to verify whether the selection performed by the presenter meets a time limit condition.

The administration back end 2 further includes a live broadcasting mode determining module 26. The live broadcasting mode determining module 26 is configured to determine whether the live broadcasting video is in landscape broadcasting mode or in a portrait broadcasting mode. The determining criterion is: if the live broadcasting mode selected by the presenter that is sent to the administration back end 2 by the client 1 is landscape, then it is determined that the live video is in landscape broadcasting mode; and if the live broadcasting mode selected by the presenter that is sent to the administration back end 2 by the client 1 is portrait, then it is determined that the live video is in portrait live broadcasting mode.

The present disclosure is not limited to the above embodiments. For a person of ordinary skills in the art, improvements and embellishments could be made within the scope of the tenets of the present disclosure, and these improvements and embellishments shall be covered by the protection scope of the present disclosure. The contents that are not described in detail in the description belong to the prior art well known to a person skilled in the art.

The invention claimed is:

1. A method for switching a living broadcast between a landscape broadcasting mode and a portrait broadcasting mode, applicable to a live broadcast website, comprising the steps of:

S1, an administrator setting, at an administration back end, categories and category settings for live broadcasting videos;

S2, the administrator adding, at the administration back end, a landscape option and a portrait option for the live broadcasting videos into each of the categories;

S3, a presenter selecting, on a client terminal, a landscape broadcasting mode or a portrait broadcasting mode as a live broadcasting mode, and selecting the category as well as the landscape or portrait option for a live broadcasting video, wherein the presenter selects the landscape or portrait option for a live broadcasting video, and the administration back end verifies whether the selection performed by the presenter meets a time limit condition, wherein if the selection performed by the presenter meets the time limit condition, then step S4 is performed;

otherwise, the administration back end returns to the client terminal a message indicating that the selecting fails, and performance of the method ends;

S4, the presenter selecting to start the live broadcast, and the administration back end verifying whether the landscape or portrait option selected by the presenter is consistent with the selected live broadcasting mode, wherein if the landscape or portrait option selected by the presenter is consistent with the selected live broadcasting mode, then step S6 is performed, otherwise, step S5 is performed;

S5, the administration back end modifying the landscape or portrait option selected by the presenter; and S6, allowing, by the administration back end, the live broadcast to start, and ending.

2. The method for switching a living broadcast between a landscape broadcasting mode and a portrait broadcasting mode, applicable to a live broadcast website, according to claim 1, wherein step S6 further comprises: after the live broadcast is finished, the presenter turns off the live broadcast, and the administration back end clears the landscape or portrait option selected by the presenter so as to allow the live broadcast to be turned off.

3. The method for switching a living broadcast between a landscape broadcasting mode and a portrait broadcasting mode, applicable to a live broadcast website, according to claim 1, wherein the category settings comprise category name, category cover, category serial number and presenter's authority.

4. The method for switching a living broadcast between a landscape broadcasting mode and a portrait broadcasting mode, applicable to a live broadcast website, according to claim 1, wherein the time limit condition is that a time period during which the presenter selects the category is greater than a preset value set by the administrator.

5. The method for switching a living broadcast between a landscape broadcasting mode and a portrait broadcasting mode, applicable to a live broadcast website, according to claim 1, wherein step S2 further comprises: the administrator adding an additional category record to a relational database management system of the administration back end, and then adding a cached data of the category record to a Redis database of the administration back end, so that the adding of the landscape option and the portrait option is completed.

6. A method for switching a living broadcast between a landscape broadcasting mode and a portrait broadcasting mode, applicable to a live broadcast website, comprising the steps of:

S1, an administrator setting, at an administration back end, categories and category settings for live broadcasting videos;

S2, the administrator adding, at the administration back end, a landscape option and a portrait option for the live broadcasting videos into each of the categories;

S3, a presenter selecting, on a client terminal, a landscape broadcasting mode or a portrait broadcasting mode as a live broadcasting mode, and selecting the category as well as the landscape or portrait option for a live broadcasting video;

S4, the presenter selecting to start the live broadcast, and the administration back end verifying whether the landscape or portrait option selected by the presenter is consistent with the selected live broadcasting mode, wherein if the landscape or portrait option selected by the presenter is consistent with the selected live broadcasting mode, then step S6 is performed, otherwise, step S5 is performed;

S5, the administration back end modifying the landscape or portrait option selected by the presenter; and S601, the administration back end allowing the live broadcast to start, and the administration back end determining whether the live broadcast is in the portrait broadcasting mode, wherein if the live broadcast is in the portrait screen broadcasting mode, then step S603 is directly performed; otherwise, step S602 is performed;

S602, the administration back end recording a log for the presenter's category operation;

S603, the presenter selecting to turn off the live broadcast, after the live broadcast is finished;

S604, the administration back end determining whether the live broadcast is in the portrait broadcasting mode, wherein if the live broadcast is in the portrait broadcasting mode, then step S605 is performed, otherwise, step S606 is performed directly;

S605, the administration back end clearing the landscape or portrait option selected by the presenter, and automatically returning to the landscape or portrait option in the log for the presenter's category operation with the log recorded in step S602 for a last time; and S606, allowing, by the administration back end, the live broadcast to be turned off, and ending.

7. The method for switching a living broadcast between a landscape broadcasting mode and a portrait broadcasting mode, applicable to a live broadcast website, according to claim 6, wherein step S6 further comprises: after the live broadcast is finished, the presenter selecting to turn off the live broadcast, and the administration back end clearing the landscape or portrait option selected by the presenter so as to allow the live broadcast to be turned off.

8. The method for switching a living broadcast between a landscape broadcasting mode and a portrait broadcasting mode, applicable to a live broadcast website, according to claim 6, wherein the category settings comprise category name, category cover, category serial number and presenter's authority.

9. The method for switching a living broadcast between a landscape broadcasting mode and a portrait broadcasting mode, applicable to a live broadcast website, according to claim 6, wherein the time limit condition is that a time period during which the presenter selects the category is greater than a preset value set by the administrator.

10. The method for switching a living broadcast between a landscape broadcasting mode and a portrait broadcasting mode, applicable to a live broadcast website, according to claim 6, wherein step S2 further comprises: the administrator adding an additional category record to a relational database management system of the administration back end, and then adding a cached data of the category record to a Redis database of the administration back end, so that the adding of the landscape option and the portrait option is completed.

\* \* \* \* \*